(12) United States Patent
King

(10) Patent No.: US 6,944,998 B1
(45) Date of Patent: Sep. 20, 2005

(54) SIMULATED MASONRY GARDEN WALLS HAVING MODULAR CONSTRUCTION

(76) Inventor: John King, 39 Hopyard Rd., East Haddam, CT (US) 06423

( * ) Notice: Subject to any disclaimer, the term of this patent is extended or adjusted under 35 U.S.C. 154(b) by 6 days.

(21) Appl. No.: 10/213,832

(22) Filed: Aug. 6, 2002

Related U.S. Application Data

(60) Provisional application No. 60/310,063, filed on Aug. 6, 2001.

(51) Int. Cl.[7] .............................. B44F 9/04; A01G 1/08; E04C 2/04
(52) U.S. Cl. .................... 52/314; 52/102; 52/585.1; 52/604; 47/33
(58) Field of Search .............................. 52/102, 585.1, 52/314, 604; 47/33; D25/151

(56) References Cited

U.S. PATENT DOCUMENTS

| | | | |
|---|---|---|---|
| 348,598 A | | 9/1886 | Strickland |
| 3,343,301 A | * | 9/1967 | Adelman ........................ 47/33 |
| 3,762,113 A | | 10/1973 | O'Mullan ..................... 52/102 |
| 4,275,540 A | * | 6/1981 | Keller ........................... 52/314 |
| 4,869,018 A | * | 9/1989 | Scales et al. ................... 47/33 |
| 4,905,409 A | * | 3/1990 | Cole ................................ 47/33 |
| 4,971,475 A | * | 11/1990 | Castonguay et al. ............ 404/7 |
| 5,080,523 A | | 1/1992 | Steiner ........................... 404/7 |
| 5,119,587 A | | 6/1992 | Waltz ............................. 47/33 |
| 5,168,678 A | * | 12/1992 | Scott et al. .................... 52/102 |
| D338,377 S | * | 8/1993 | Scott et al. ...................... D8/1 |
| D338,812 S | * | 8/1993 | Scott et al. ...................... D8/1 |
| 5,259,154 A | * | 11/1993 | Lilley .............................. 47/33 |
| D343,509 S | * | 1/1994 | Scott et al. ...................... D8/1 |
| D346,726 S | * | 5/1994 | Scott et al. ...................... D8/1 |
| D371,446 S | | 7/1996 | VanDeusen ................ D25/113 |
| 5,675,930 A | * | 10/1997 | Cooper ........................... 47/33 |
| D386,265 S | * | 11/1997 | Ellington .................... D25/113 |
| 5,806,249 A | * | 9/1998 | Helms ........................... 52/102 |
| D402,380 S | | 12/1998 | Komorski ................... D25/164 |
| 5,921,021 A | * | 7/1999 | Coates ............................ 47/33 |
| 6,085,458 A | * | 7/2000 | Gau ................................ 47/33 |
| D438,992 S | * | 3/2001 | Chrisco et al. ............. D25/164 |
| D448,859 S | | 10/2001 | Doman ....................... D25/113 |
| D455,504 S | * | 4/2002 | Foster ........................ D25/164 |
| 6,418,675 B1 | * | 7/2002 | Peggs et al. .................. 52/102 |
| D472,984 S | * | 4/2003 | Foster ........................ D25/164 |

FOREIGN PATENT DOCUMENTS

| | | | | |
|---|---|---|---|---|
| JP | 8-5378 | * | 1/1996 | ........... G01C 15/04 |
| JP | 2000-94460 | * | 4/2000 | ........... B29C 39/10 |
| JP | 2000-94553 | * | 4/2000 | ............ B32B 3/30 |

* cited by examiner

*Primary Examiner*—Robert Canfield
(74) *Attorney, Agent, or Firm*—C. Nessler

(57) ABSTRACT

A simulated masonry module, made of blow molded plastic, has a box-like body with a textured front and top. Modules are pin-connected to each other at interleaving ends. They may be stacked, to form assemblies simulating a masonry wall. Straight, curved or angled walls may be constructed, as well as enclosures suited to contain soil or water in a tub-like liner. Filler blocks mate with the ends for make square terminal ends of wall segments. Sand or other material may be put inside the modules through a rear access port, to add mass and stability. The bottom of a module has sculpting, to loosely fit and interlock with the contour of the top of a like-module, when modules are stacked, so the horizontal joint is unobtrusive. A spike, used for connecting module ends, is retained in a shaped groove on the rear of the module, to enable convenient shipment of a module and spike combination.

13 Claims, 7 Drawing Sheets

SIMULATED MASONRY GARDEN WALLS HAVING MODULAR CONSTRUCTION

This application claims benefit of provisional patent application Ser. No. 60/310,063, filed Aug. 6, 2001.

TECHNICAL FIELD

The present invention relates to simulated masonry articles; in particular, articles made of plastic or other non-ceramic material, which in appearance seem to be portions of stone or brick walls, for use in decorative gardens.

BACKGROUND

Masonry objects, that is, things comprised of stone or brick have long been used in natural and artificial gardens for esthetic and functional purposes. For instance, masonry walls are used to define boundaries and retain earth. Typically, good construction requires some sort of foundation, particularly when the ground alternately freezes and thaws. In any case, masonry structures are inherently heavy and need to have adequate structural support.

Simulated masonry articles in general are known. For instance, they are used when gardens are placed within a building, where the weight of masonry walls and other objects is undesirable from the standpoint of the structure. Similarly, it is desirable to have light weight objects when portability, easy placement or easy rearrangement of the units is an aim. In the past, simulated masonry articles have been made of such as painted wood, plaster, and plastic resins, etc. Simulated rocks, which are hollow and are made of molded plastic resin, have been known for decorative purposes, for use in exterior and interior locations.

Modular garden wall systems are known. For instance: U.S. Pat. No. 5,080,523 to Steiner describes a modular concrete wall system. U.S. Pat. No. 348,598 to Strickland shows curved concrete modules. U.S. Pat. No. 3,762,113 to O'Mullan shows molded plastic edging. U.S. Pat. No. 4,275,540 shows a modular plastic 4-high brick wall, with open rear sides which can be closed with a panel. The interlocking stepped ends of the modules are held together by pins, which optionally extend into the earth. Filler blocks are used to make vertical plane ends.

The modular garden wall systems in the prior art have various advantages and disadvantages. Some are obviously heavy. While they are stable, they are difficult to transport, move about, and store. On the other hand, simulated masonry which is so light that it does not stay in place can fail to achieve more than a simple cosmetic effect. Simulated masonry often fails to be good looking and sufficiently simulative of ordinary masonry. Other prior art designs are expensive to fabricate. Still others have means for connecting which does not combine well cost, simplicity, appearance of the joint, and ease of assembly or disassembly. Thus, there is a need for improvements.

SUMMARY

An object of the present invention is to provide a three dimensional realistic looking wall which simulates the appearance of a masonry wall; and which can be assembled from modules. An object is to have a kit with which to construct a wall which is straight, angled or curved, or formed into an enclosure to contain soil or water, according to what a user desires.

Another object is to provide means for interconnecting modular modules and for keeping them in place against lateral forces. Another object is to provide a simulated the wall which is durable—resistant to mechanical and weather damage, and to provide a wall which is strong but light enough to be assembled, disassembled, and moved about manually by an ordinary person. Another further object is to provide good-looking wall modules that are suited for manufacture on a production basis.

The present invention is concerned with molded articles, in particular generally rectanguloid hollow or box-like articles which simulate the appearance, and to in differing degrees the function, of walls made of stone or brick, when put in place in the field, for example, in a natural or artificial garden, or other use. Preferably the articles, called modules, are made of molded plastic resin such as blow molded high density polyethylene.

In accord with the invention, a simulated masonry wall module is comprised of a box-like body having a front side which is textured, preferably also a top side which is textured, ends which join together with like modules in horizontal interleave fashion, and means for pinning the mated modules. Preferred interleaving ends are alternatively clevis and tang, or simple overlap of cantilever end segments. Preferred means for pinning together comprises a pin passed through holes in the ends of the module, and when appropriate into the ground supporting the modules. Alternative means for pinning comprises an embossed point for penetration by a pin, or a male molded projection, which engages a female depression of the opposing end of a mating like-module. When desired, filler blocks which mate with the ends are used to form essentially vertical or square ends.

In accord with the invention, when modules are stacked in layers, for instance to form a two-module high wall, the ends are vertically aligned and pins run through the stacked modules, preferably into the underlying support material. Preferably, the top and front of the module are textured to simulate a wall, such as laid up quarry stone; and, the bottom side of a module is sculpted in a mirror image, so it loosely fits the texture or contour of the top. Thus, when units are stacked, the horizontal joint is unobtrusive. An alternate embodiment module has a separate cap which attaches to a plain surface top. Preferably, the cap extends laterally from the front and back.

Modules may be straight, curved or angled, and they are connectable end to end to form segments of walls or enclosures. Preferred modules have depressions on the upper end of the rear, so a liner contained in an enclosure may be fastened in place. To make shipping easier, preferred modules have a groove in the rear side, which is shaped to receive and retain a pin used to connect the units, so the pin is substantially beneath the plane of the rear surface.

Preferred modules have an opening in the rear, so that sand, gravel or other material may be placed inside the modules to increase their mass and stability. Other optional features, which aid stability, include a flange extending off the rear and vertical fins on the underside. Optionally, nubs with vertical holes are attached to the rear side of a module to receive vertical shafts and the like, such as a flag staff or trellis bottom.

The foregoing and other objects, features and advantages of the present invention will become more apparent from the following description of preferred embodiments and accompanying drawings.

DESCRIPTION

Some of the matter described herein was previously disclosed in provisional patent application Ser. No. 60/310,063, filed Aug. 6, 2001, the description and drawings of which are hereby incorporated by reference.

Figure 13:
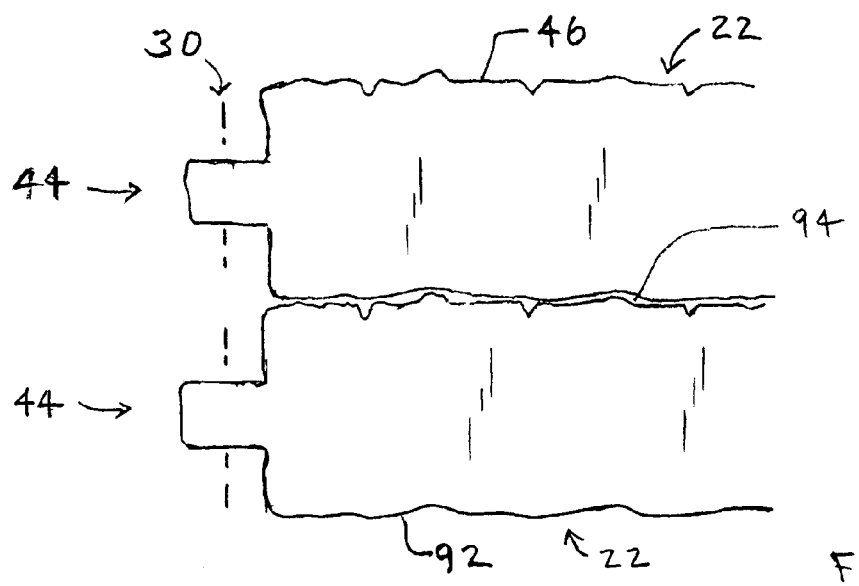
FIG. 13 is a simplified vertical elevation view of the a portion of two stacked modules, showing how the ends align and how the depressions on the bottom interact with the contours on the top of the module.
Figure 14:
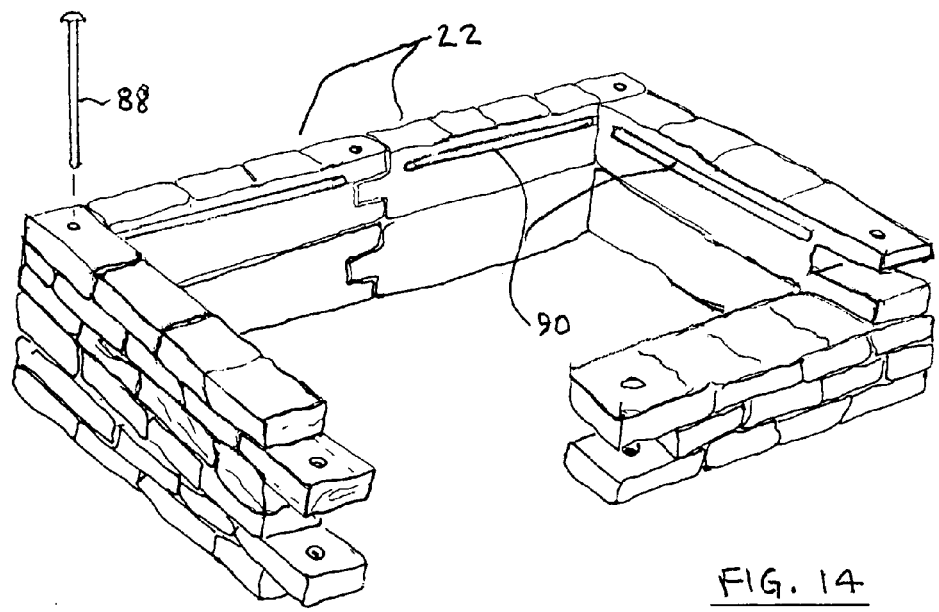
FIG. 14 shows how modules may be interconnected and stacked two-high, to form a rectangular enclosure.

In the invention, walls are formed from modular straight or curved elements—called modules or modules hereafter. The modules may be sold as kits and can be interconnected to make assemblies which may be enclosures or free end structures. The modules may be straight, curved or angled. In different embodiments, modules interconnect in different ways. The modules may be connected as a single row. One row may be stacked on another, as shown in FIGS. 13 and 14. The structures may be used in various ways, such as for free standing decorative units, for dividing a plot, or for forming an enclosure holding a container of water, as a pond.

The modules are nominally rectanguloid cross section hollow structures and therefore they are referred to as being box-like. Modules are preferably made of blow molded high density polyethylene with a nominal 0.12 to 0.25 inch wall thickness. Alternately, fiberglass-polyurethane, and other commercial polymers or polymer composites may be used. Other non-masonry materials may be considered, such as paper products, and molded wood. Commercial plastic blow-molding fabrication technology is used to form the components that are described here.

Figure 1:
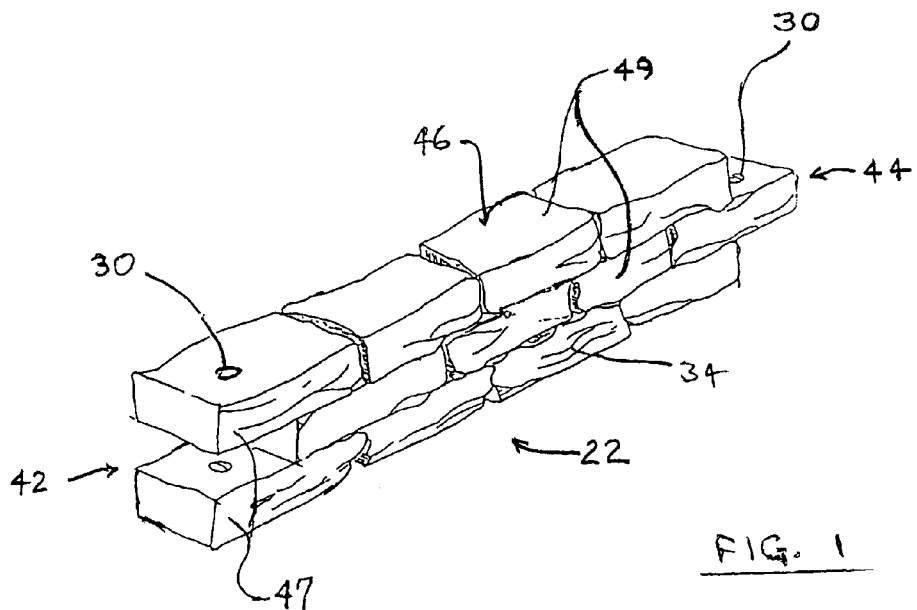
FIG. 1 is an isometric view of the front of a module which simulates a masonry wall. The module connects at tang and clevis ends with like modules or other components to form an assembly.
Figure 2:
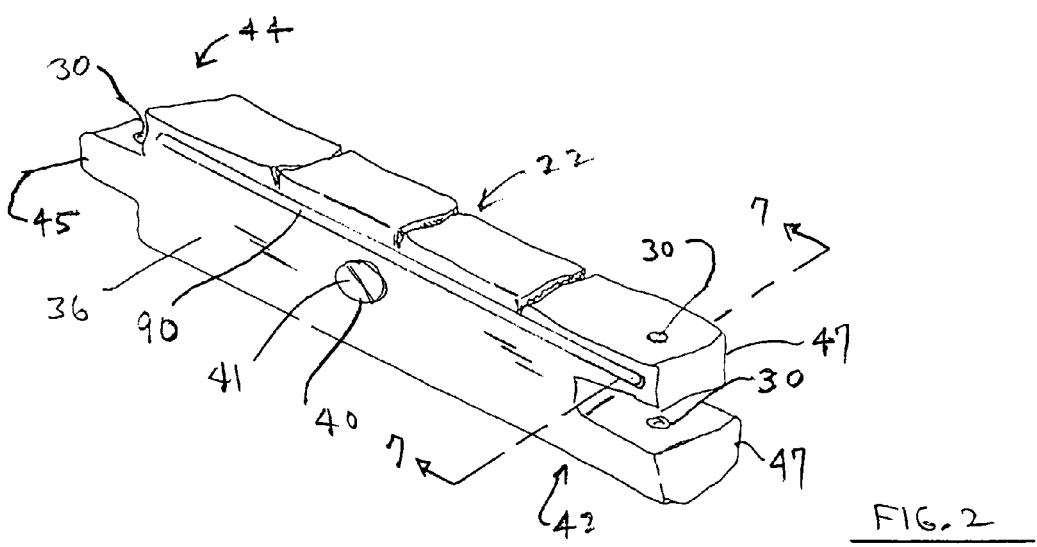
FIG. 2 is an isometric and simplified view of the rear of the FIG. 1 module.

FIG. 1 is an isometric view of a typical article or module 22 from the front. FIG. 2 shows the same unit from the rear. In the exemplary module of FIG. 1, the front side 34, which runs along the length of unit, and the top side 46, are sculpted artistically to simulate the appearance of a natural laid quarry stone wall. There is a texture to the top and front. As used herein, the term texture comprehends or includes that a surface will also have a contour, that is, the term includes coarse as well as fine variations in the surface. The relief of the sculpting or texture is typically one quarter to one inch. The vertical end surfaces have lesser sculpting, owing to limitations of the manufacturing method. The faces either have integral coloring or are painted to simulate the color of stone. Other masonry, such as rubble stone and brick may be simulated. Surfaces which are not finished are called plain surfaces.

The exemplary unit 22 shown in FIG. 1 is about 48 inch in overall length, about 10 inch high, and about 6 inch depth. It has three courses, or horizontal layers, of simulated stones 49 laid with mortar. More or less courses of stone may be simulated. Of course, different dimensions of units may be used, alone or in mixed fashion. Masonry simulation appearances other than those described in the examples may be used, for example rubble stone and brick. At least the front 34 of the unit is textured. Usually, the top 46 is textured, as shown in FIG. 1. The rear side 36 will typically not be textured, simply for reasons of economics, primarily relating to finishing. The bottom surface may be plain or textured. It is discussed further below. Ribbing or other unevenness may be employed, albeit infrequently, on the rear side, and on the interior module surfaces, to impart strength to the walls of the modules.

With reference to FIG. 1 and FIG. 2, the module 22 has a female end 42 and a male end 44, so like units can be joined together to form an assembly which is an essentially continuous wall, which means that in fit and visual appearance it will seem to a casual observer that the wall does not have joints. The casual observer will not quickly see the places where the ends engage or where one layer of modules overlies another layer.

Figure 3:
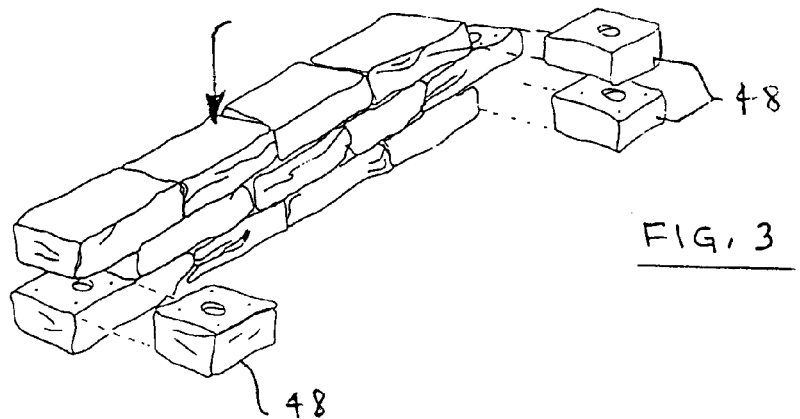
FIG. 3 shows how filler blocks engage a module to construct an assembly with square ends.

Different mating end shapes may be used, within the object of having horizontal overlap between a portion of one module and the connecting module. In the module 22 shown in FIG. 1 and FIG. 2, male end 44 comprises a tang 45, which runs laterally or horizontally transverse to the module length. It is shaped to fit into the recess 28 of the two clevis portions 47 which comprise the female end 42 of a like, or identical, module. The vertical thickness of the tang and two clevis portions corresponds with the grooves that define the simulated stone layers of the front face, or the mortar joints of brick simulation, etc. The terminal ends of one module, or of the end of a string of such tang and clevis end modules, can have a squared off appearance by the use of insertable filler blocks 48, shown in FIG. 3. The filler blocks have material and construction similar to the modules. Filler blocks may also be used with an alternative end configuration, shown in FIG. 17.

Figure 12:
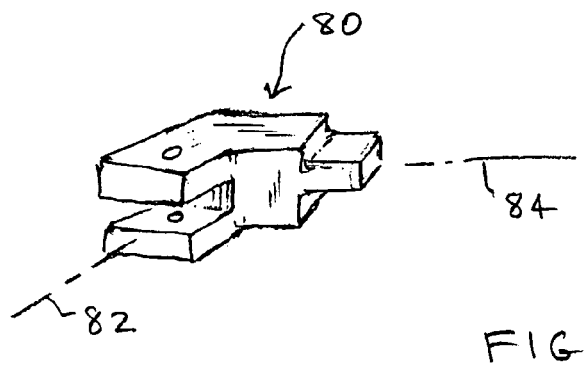
FIG. 12 shows an angle coupling, which is a short module having non-parallel ends.
Figure 15:
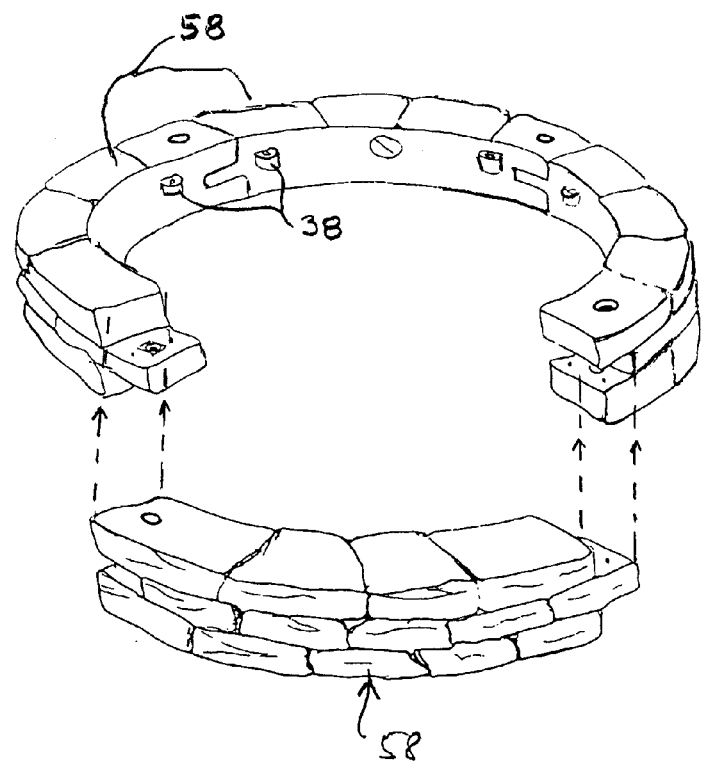
FIG. 15 shows curved modules connected to form a circle, where the modules have nubs on the rear side.

With the ends and connections shown herein, modules may be assembled to form a straight run wall of indefinite length; or to form a rectangular enclosure as shown in FIG. 14. Curved modules 58 may be made, and connected to form a circle 48, as shown in FIG. 15. Straight and curved units may be connected, for instance to make a D-shape enclosure, not shown. For sharp angles between modules, an angle coupling 80, as shown in FIG. 12 is used. Coupling 80 is simply a short module, where the longitudinal axes 82, 84 of the opposing module ends are not parallel. The angle between axes is chosen according to the need. For instance, the angle is 72 degrees if a pentagon were to be constructed.

Figure 11:
FIG. 11 shows a spike which is used for pinning module together.

The ends 42, 44 of module 22 have vertical holes 30, so that when the modules are mated, pin fasteners, such as spike 88, may be run vertically down through the holes, to hold modules together. See FIG. 14. Preferably, the fastener is a button head steel boat spike 88, as shown in FIG. 11. When the material underlying a module permits, one or more of the fasteners optionally penetrate vertically into the material—such as soil, sand, or wood, to thereby hold a module(s) in place. The length of the fastener is chosen according to what is desired in this respect, and according to how many modules are stacked.

Figure 4:
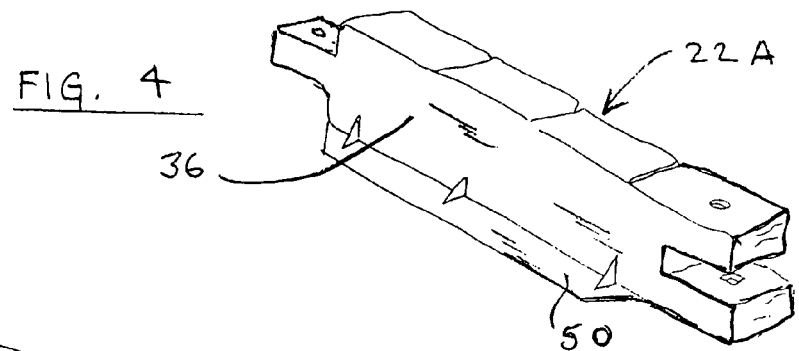
FIG. 4 shows the rear side of a module having a flange extending laterally from the bottom.
Figure 5:
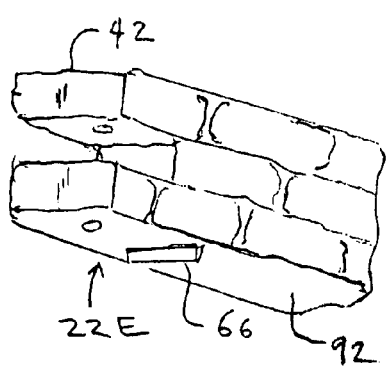
FIG. 5 shows a portion of the end and underside of a module having a transverse fin or rib on the underside.

FIG. 4 shows a module 22A having a lateral flange 50 with three gussets, extending rearwardly from the lower end of rear side 36. Thus, earth or other objects can be placed on the flange, to hold the unit in place. The flange will also serve to inhibit the extent to which erosion and washing of soil under the wall will take place. Ribs or fins extending vertically down from the bottom may be employed for holding units in place when they are mounted on penetrable material, such as soft soil. FIG. 5 shows a fin 66 running transversely on module 22E. Alternately, bottom fins can run lengthwise.

Preferably, the end to end fit between tang and clevis of mating units is tight, as is the fit of the pin in the module. Thus, no more than a few degrees of rotational movement is possible at the connection, since there is interference fit between the terminal vertical surfaces of the mating parts of the ends. In another embodiment, the fits may be loosened to permit a greater degree of angling between units, but not so much as to make the vertical joint prominent.

Figure 7A:
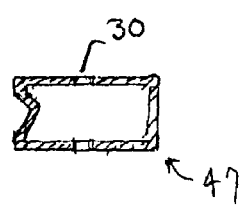
FIGS. 7A, 7B and 7C show alternate constructions for means for pinning of the end of a module.
Figure 7B:
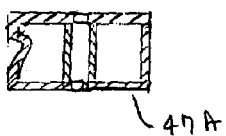
Figure 7C:
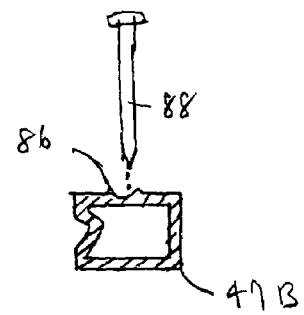

FIGS. 7A, 7B and 7C show, through example of a cross section portion of the clevis, how the module end has means for pinning, for use of a pin, such as a spike. Typically, a simple hole is drilled in the unit, as illustrated for clevis portion 47 in FIG. 10A. An appropriate sealant may be used around the fastener where it penetrates the module. Alternately, there may be a sleeve running between the upper and lower surfaces of the section of module through which the pin passes, to resist distortion in the event of excessive downward force on the pin, or to provide better sealing, as in FIG. 7B. Alternately, an installer user may drive the pin or other fastener, such as a screw, through the thickness of the top surface of a module at a point where there is embossing 86, such as a pocket or a ring, on the module, as indicated for clevis part 47A in FIG. 7C. The means for pinning includes ends as just described. It may also include a pin itself.

Figure 8:
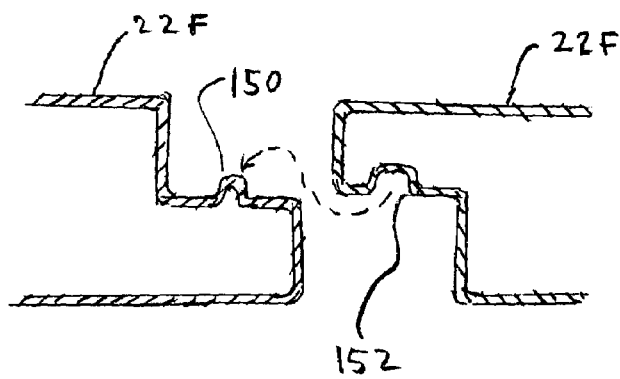
FIG. 8 shows another alternative means for pinning the end of a module, which means are molded into the plastic surface of a module end.

Other pinning means may be used. For instance, FIG. 8 shows a module having an alternative simple overlap end configuration, discussed further below in connection with FIG. 17. The means for pinning, shown in FIG. 8, comprises a molded plastic projection 150 on the male function end. It is received in a cavity 152 on the underside of female function second end of a like module, as indicated by the dashed arrow. Other fasteners and constructions, which function as means for pinning in preventing longitudinal and lateral motion, may be used at the ends may be used within the generality of the invention. Modules may also be pinned to the supporting surface and each other by other fasteners, at or away from the ends, as desired.

Figure 6:
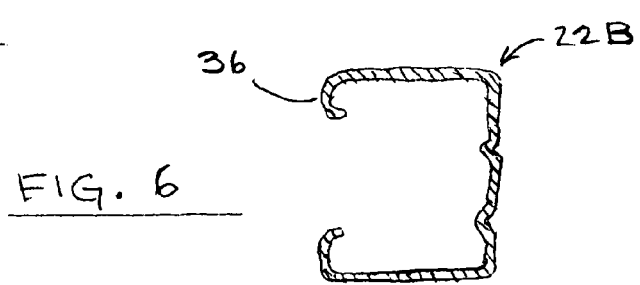
FIG. 6 shows the cross section of a module with a substantially open rear side.

The preferred plastic modules are light in weight for portability and cost. Module 22 has one or more removable access holes 40 which are fitted with removable plugs 41, on the rear face 36. See FIG. 2 and FIG. 10. Openings 40 provide access to the interiors of the units, so that sand, gravel, water (when the units are water tight) and other material may be placed inside the units to give them greater mass and make them more stable when resting in place. The access openings may be made larger than suggested by the Figure, to enable a person's hand to fit inside the units, so they may be bolted together. Alternately, the rear side is made substantially open, as shown by the cross section of module 22B, in FIG. 6.

Figure 9:
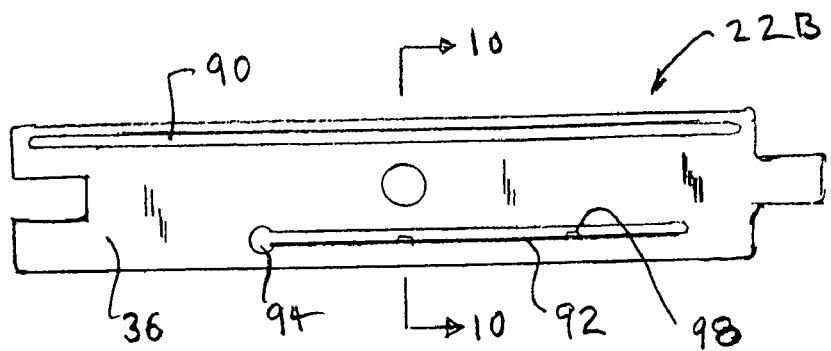
FIG. 9 shows the rear side of a module, to illustrate two different kinds of depression or groove, one of which receives a spike for shipment
Figure 10:
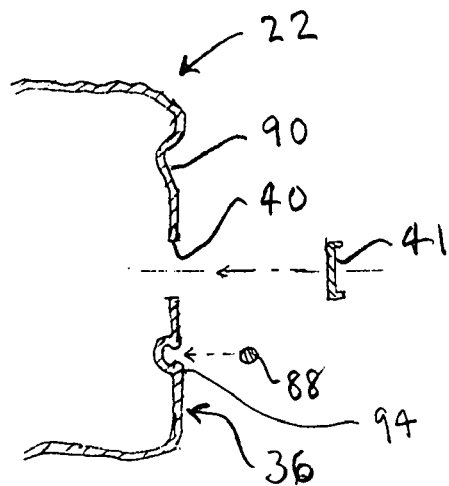
FIG. 10 is a cross section through the module shown in FIG. 9.

FIG. 9 and FIG. 10 show the rear side 36 of module 22. Two useful features (not shown in FIG. 2 for clarity there) are present. The first is lengthwise depression 90 near the top of the rear side. The depression receives double sided adhesive tape or other fastening means when a tub like liner is used, as described below. The second feature is a lengthwise depression, groove 92, near the bottom of the rear side. It receives and retains boat spike 88 during shipment of the module. Preferably, groove 92 has a first width portion, to accommodate the major shank part of the spike; and, there is a wider width slot end portion 94, to receive the head 96 of the boat spike or like headed fastener, shown in FIG. 11. There are two or more projections 98 on the bottom side of the groove 92. The groove has more concavity at its top surface than at its bottom. Thus, when a spike is pressed into the groove, the plastic of the module elastically deforms and springs back, so the spike is retained in the groove. An installer removes the spike by pulling or prying at the time of assembly of modules. The groove is shaped so that the shank part, at least, is substantially below the nominal surface plane of the rear side. Thus, the dimension of any shipping package is essentially the same as for the plain module, and need for separate and bulky spike-packaging is avoided.

FIG. 14 shows a partially constructed rectangular enclosure and illustrated how modules 22 may be stacked, at least two-high. In some instances, units might be stacked even higher. Spikes 88 pass through the ends of the stacked modules, optionally into the supporting surface. FIG. 14 and the fragmentary elevation view of FIG. 13 emphasize how the units stack, with the ends of an upper layer module in alignment with the end of the module of the underlying layer. This is different from a conventional way of stacking such kinds of things, wherein end joints are offset, layer to layer. An upper layer of units may be further screwed, bolted or adhesively attached to the under-layer.

Preferably, the bottom side 92 of module 22 has a sculpting which is loosely shaped to be the female impression of the top side, so it is an approximate mirror shape of the top. FIG. 13 illustrates the kind of mirror impression and fit obtained at the joint 94. It is better than the fit which is obtained when the bottom is flat or contoured without respect to the top side texture/contour. The space or air gap of joint 94 between the units is thus lessened so that there is unobtrusive visual impression of the joint between the units and improved stability to the assembly. When there is a loosely shaped mirror impression, then with gentle horizontal plane motion of the top unit by the installer, there will be found a location where the top unit engages or interlocks with the underlying unit, thus providing a reduced or minimum height to the assembly. Of course, a more precise mirror of the top surface could be alternatively be imparted to the bottom, although that would raise cost, and would not accommodate small particles of debris so well. In the generality of the invention, the bottom can be plain.

Figure 16:
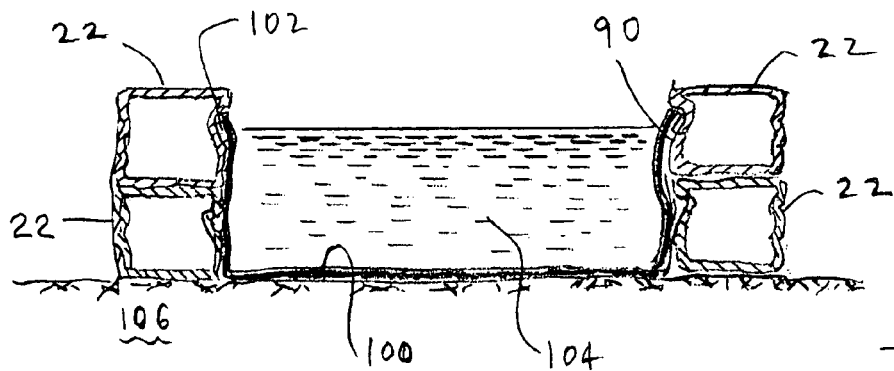
FIG. 16 is a vertical cross section through an enclosure containing a liner filled with water.

FIG. 14 illustrates how depressions 90 on the rear side of each unit cooperate, to form a nearly continuous lengthwise depression running preponderantly around the top of the interior of an enclosure. FIG. 16 shows a vertical cross section of a rectangular, square, round, etc., enclosure like that shown in FIG. 14, resting on soil 106. The aligned depressions 90 receive the upper ends of a tub shape liner 100 of water tight material, such as common plastic sheeting or a specially molded unit, positioned within the enclosure and is substantially filled with water 104. Double-sided adhesive tape 106 preferably holds the liner in the depression, creating a neat appearance. Alternately, screws and trims strip may be used.

Figure 17:
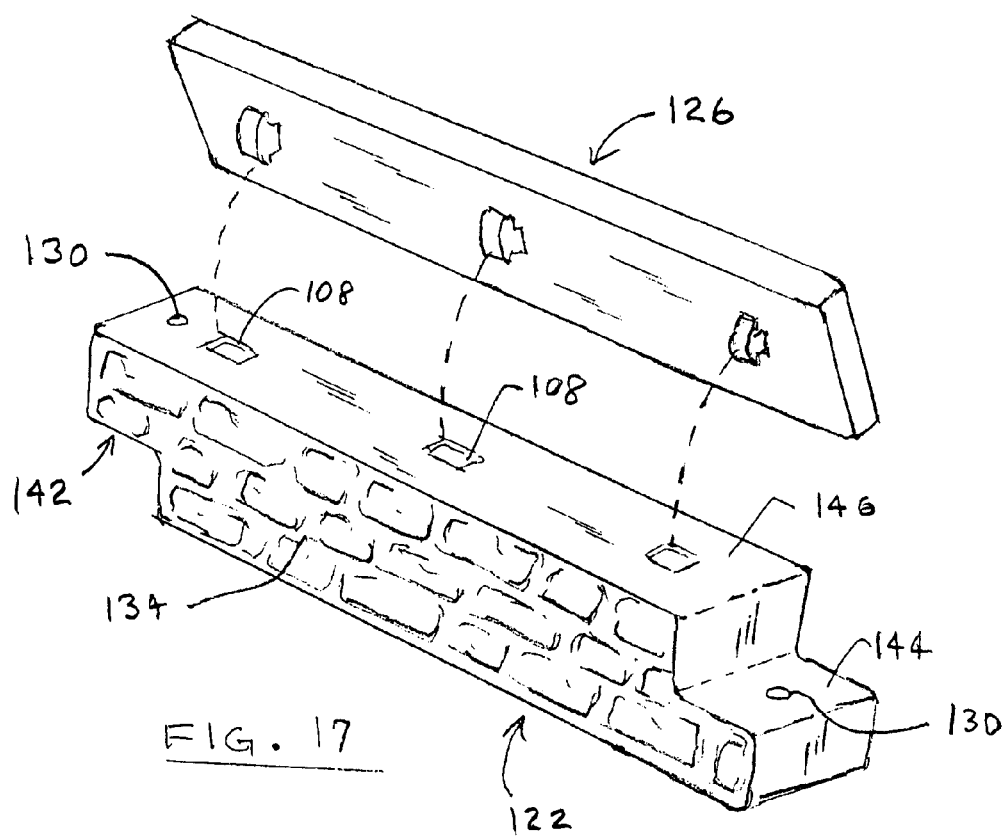
FIG. 17 is an isometric view of a module having a removable cap and simple overlap ends.

FIG. 17 shows alternate embodiment configuration module 122. It has different style ends from those shown in FIG. 1. The ends are called simple overlap ends. They are different from the clevis and tang of FIG. 1, but in both embodiments one end interleaves with the other. End 142 is horizontal cantilever segment extending from the top of the module, and end 144 is a like segment extending from the bottom of the unit. When like-modules are joined, the fit between the segments comprises a joint with means for pinning 130, similar to that previously described. The ends in FIG. 17 may used on the module with textured top and front, as shown in FIG. 1.

As shown in FIG. 17, module 122 has a plain top and a cap 124 which attaches to the top. The top side of the module is flat and plain. It has a multiplicity of holes or pockets 108, shaped to receive the projections 110 which extend downwardly from the separately formed cap 124. In the Figure, the projections are arrowhead shape tabs which will snap into place within the cutout holes 108. When installed, the cap may have a top surface which is simulative of a flat stone, for instance, and the front and back edges extend beyond the nominal vertical planes of the front and back sides of the lower portion of the assembly, i.e., the front side 134 and rear side 136.

Other features may be employed on modules. FIG. 15 shows nubs 38 with vertical through-holes, which may extend from the rear side of any configuration module. The nubs may receive further pins which pass vertically into the earth. Or, they may receive the end of a flagstaff, or the lower vertical portions of legs of a trellis, and so forth.

The artistic or decorative appearance of the modules 22, 122, particularly as shown in FIGS. 1, 2, 3, 9, 14, 15 and 17, is an invention.

The modules of the invention achieve the objects set forth above, including that they are suited to economic mass production; that they are light in weight, so they can be readily shipped and assembled; that they are durable; and that they can be assembled in a variety of different configurations, and then disassembled and stored.

Although this invention has been shown and described with respect to a preferred embodiment, it will be understood by those skilled in this art that various changes in form and detail thereof may be made without departing from the spirit and scope of the claimed invention.

What is claimed is:

1. A simulated masonry wall module, comprising:
a box-like body having a front side, rear side, top, bottom and opposing first and second ends; wherein at least the front side and top side have textured surfaces simulative of natural laid quarry stone masonry;
the first end and second end of the body having mating shapes, so that the ends of like bodies may be joined each to the other in horizontal interleave fashion, to provide an assembly having a front side which appears essentially as continuous simulative masonry;
wherein, each said end comprises means for pinning together the ends of mated modules;
wherein the top has textured surface in a coarse form which is simulative of individual quarry stones and in fine form which is simulative of variations in the surface contour of each individual simulated stone; wherein said bottom is sculpted with an approximate mirror image contour of the top of the module, including said coarse and fine textured surfaces, so that when one module is stacked atop another like module, the bottom of the one module mates and interlocks with the top of the other module, and the modules fit more closely than in the absence of said sculpted bottom.

2. A simulated masonry wall module, comprising:
a box-like body having a front side, rear side, top, bottom and opposing first and second ends; wherein at least the front and top have textured surfaces simulative of masonry;
the first end and second end of the body having mating shapes, so that the ends of like bodies may be joined each to the other in horizontal interleave fashion, to provide an assembly having a front side which appears essentially as continuous simulative masonry;
wherein, each said end comprises means for pinning together the ends of mated modules;
wherein the bottom of the module is sculpted with an approximate mirror image contour, to loosely fit the texture of the top of a like module; and, wherein, when two modules are stacked as a two high layer in mated and interlock fashion, the ends of the modules are vertically aligned.

3. The module of claim 2 wherein the first end is a male part comprising a single lateral tenon and the second end is a female part comprising a clevis.

4. The module of claim 3 wherein the means for pinning comprises a vertical protuberance at the first end of the module; and, the second end comprises a pocket, shaped to receive the vertical protuberance of a like module.

5. An assembly comprised of a plurality of modules of claim 2 connected end to end and mounted on a plurality of like modules, to form a two-high module simulated masonry wall length.

6. The module of claim 2, which is made of polymer and has a hollow interior, further comprising at least one hole on the rear side of the module, for providing access to said hollow interior.

7. The module of claim 2 further comprising a plurality of nubs on the rear side; the nubs having vertical holes for receiving attachments to the module.

8. An assembly of modules of claim 2, interconnected end to end, to form an enclosure with front sides of the modules facing outwardly.

9. The assembly of claim 8, further comprising:
a tub shaped liner positioned within the enclosure, for containing liquid or soil, the liner comprising an upward extending circumscribing wall resting against the rear sides of the modules of the enclosure;
wherein at least one module further comprises a depression running lengthwise along the upper portion of the rear side of the module; and,
means for fastening a portion of said upward extending liner wall within said depression.

10. The assembly of claim 9 wherein said means for fastening is an adhesive strip.

11. An module made of a non-masonry material, which module simulates in appearance a masonry structure, comprising:
- a box-like body having a front side, rear side, top, bottom and opposing first and second ends; wherein at least the front side has textured surfaces simulative of masonry;
- the first end and second end of the body having mating shapes, so that like bodies may be joined each to the other in interleave fashion, to form an assembly having a front side which appears essentially as continuous simulative masonry;
- means for pinning together said ends, so a modules may be connected to a second like module;
- a cap, having a simulated masonry appearance, attached to the top side of the module; and,
- means for attaching the cap to the top side of the module.

12. The module of claim 11 wherein the means for attaching the cap to the body comprises: a multiplicity of female pockets or holes on the top side of the module; and a multiplicity of mating projections extending downwardly from the underside of the cap.

13. The module of claim 11 wherein the cap extends laterally beyond a nominal vertical plane front side or rear side.

\* \* \* \* \*